(12) United States Patent
Hanafee et al.

(10) Patent No.: US 11,023,925 B1
(45) Date of Patent: Jun. 1, 2021

(54) ENHANCED ADVERTISEMENT CLICK-THROUGH CUSTOMER DATA

(71) Applicant: Wells Fargo Bank, N.A., San Francisco, CA (US)

(72) Inventors: Brian Hanafee, Pleasanton, CA (US); Laura Lee Orcutt, Chanhassen, MN (US); Aashir Shroff, Palo Alto, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 326 days.

(21) Appl. No.: 15/355,153

(22) Filed: Nov. 18, 2016

(51) Int. Cl.
*G06Q 30/02* (2012.01)

(52) U.S. Cl.
CPC ..... *G06Q 30/0255* (2013.01); *G06Q 30/0277* (2013.01)

(58) Field of Classification Search
CPC .................. G06Q 30/0255; G06Q 30/0277
USPC ........... 705/14.66, 14.55, 35, 14.42; 715/835
See application file for complete search history.

(56) References Cited

U.S. PATENT DOCUMENTS

| 7,028,072 B1 | 4/2006 | Kliger et al. |
| 2006/0293957 A1 | 12/2006 | Petersen et al. |
| 2008/0154757 A1* | 6/2008 | Barros ................. G06Q 20/227 705/35 |
| 2011/0107265 A1* | 5/2011 | Buchanan ............. G06Q 40/02 715/835 |
| 2013/0325587 A1* | 12/2013 | Kothari ............. G06Q 30/0201 705/14.42 |
| 2013/0325611 A1* | 12/2013 | Delug ................ G06Q 30/0267 705/14.55 |

FOREIGN PATENT DOCUMENTS

KR        20020088036 A  * 11/2002

OTHER PUBLICATIONS

Kristina Volovich, What's a Good Clickthrough Rate? New Benchmark Data for Google AdWords, 2016 (Year: 2016).*

* cited by examiner

*Primary Examiner* — Tarek Elchanti
(74) *Attorney, Agent, or Firm* — Foley & Lardner LLP

(57) ABSTRACT

A computing system receives a request for an advertiser webpage from a user device associated with a consumer. The consumer requests the advertiser webpage by activating a link associated with the advertiser webpage and embedded in the advertisement placed on the webpage of the publisher. The advertiser computing system also receives financial information relating to the consumer in response to receiving the request, customizes the advertiser webpage based at least in part on the financial information relating to the consumer, and transmits the customized advertiser webpage to the user device.

25 Claims, 3 Drawing Sheets

US 11,023,925 B1

ENHANCED ADVERTISEMENT CLICK-THROUGH CUSTOMER DATA

TECHNICAL FIELD

The present disclosure relates generally to the field of online advertising.

BACKGROUND

An advertiser attempts to make an advertisement as effective as possible by presenting the advertisement to consumers who are more likely to have an interest in the advertised products/services, thereby generating increased revenues. Technologies such as targeted advertising are employed whereby advertisements are placed so as to reach consumers based on various traits such as demographics, psychographics, behavioral variables (e.g., product purchase history), etc. However, even if a consumer clicks on the advertisement, the consumer might not purchase a product/service offered by the advertiser because of, for example, high price, non-ideal payment arrangement, or other concerns. A more effective way of online advertising that incentivizes consumers to purchase the advertised products/services are desirable.

SUMMARY

One example embodiment relates to a method. The method includes receiving, by a computing system, a request for an advertiser webpage from a user device associated with a consumer. The consumer requests the advertiser webpage by activating a link associated with the advertiser webpage and embedded in an advertisement placed on a webpage of a publisher. The method also includes receiving, by the computing system, financial information relating to the consumer in response to receiving the request, customizing, by the computing system, the advertiser webpage based at least in part on the financial information relating to the consumer, and transmitting, by the computing system, the customized advertiser webpage to the user device.

Another example embodiment relates to a computing system. The computing system includes a products/services database having information relating to products and/or services offered by an advertiser, a network interface configured to communicate data to and from external devices, memory, and a processor. The processor is structured to receive a request for an advertiser webpage from a user device associated with a consumer. The consumer requests the advertiser webpage by activating a link associated with the advertiser webpage and embedded in an advertisement placed on a webpage of a publisher. The processor is also structured to receive financial information relating to the consumer in response to receiving the request, customize the advertiser webpage based on the financial information relating to the consumer, and transmit the customized advertiser webpage to a user device.

A further example embodiment relates to a non-transitory computer-readable media having computer-executable instructions embodied therein, when executed by a processor of a computing system, cause the computing system to perform a process. The process includes receiving a request for an advertiser webpage from a user device associated with a consumer. The consumer requests the advertiser webpage by activating a link associated with the advertiser webpage and embedded in an advertisement placed on a webpage of a publisher. The process also includes receiving financial information relating to the consumer in response to receiving the request, customizing the advertiser webpage based at least in part on the financial information relating to the consumer, and transmitting the customized advertiser webpage to the user device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
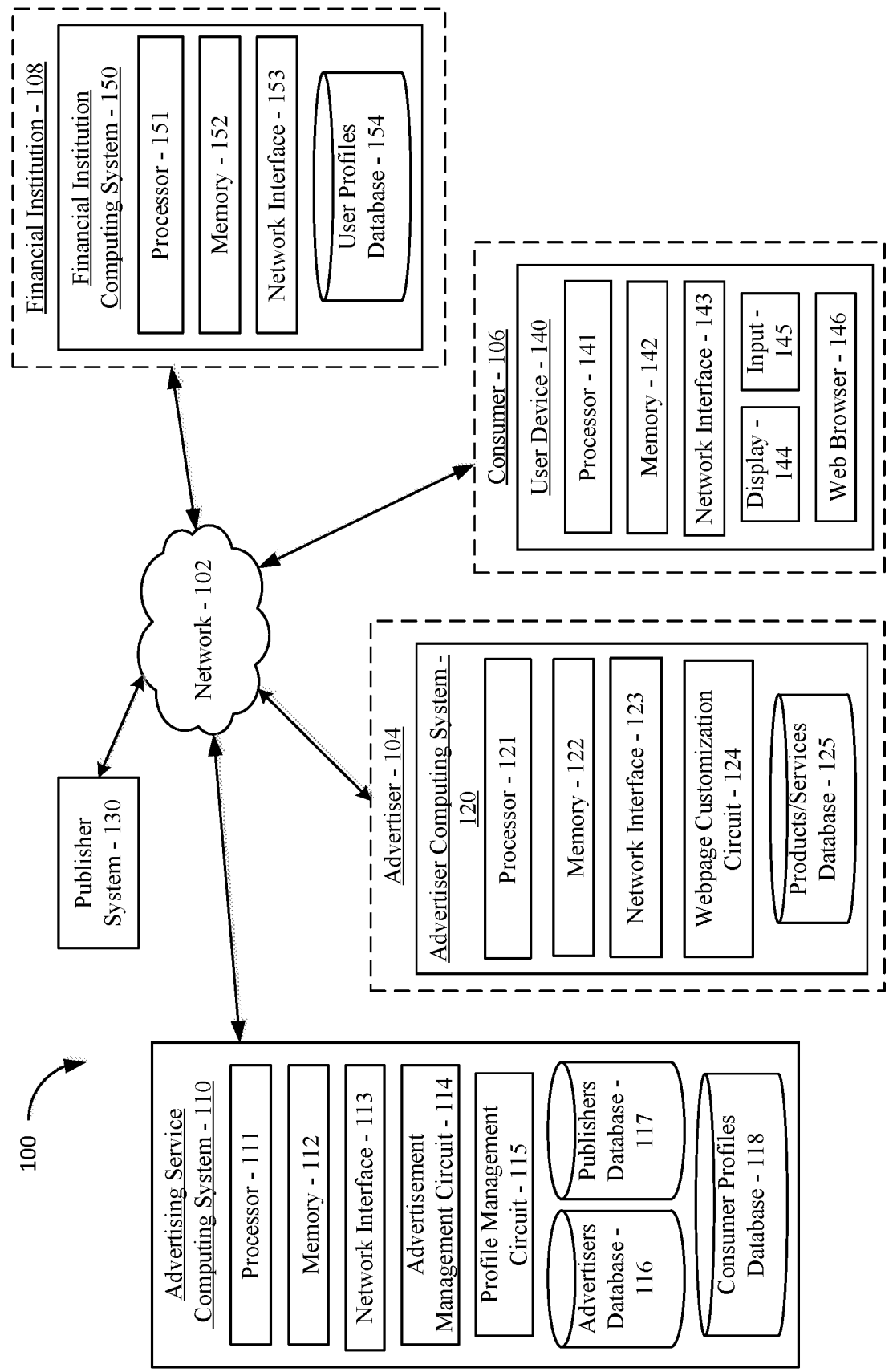
FIG. 1 is a block diagram of a computing environment for providing a customized advertiser webpage to a consumer according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing a customized advertiser webpage to a consumer based on financial information relating to the consumer are described. In particular, an advertiser computing system places a link (e.g., a URL) to an advertiser webpage (e.g., in an advertisement of the advertiser) on a webpage of a publisher that is being displayed to a consumer (e.g., via a user device). Sometimes, the advertiser can place the advertisement on the publisher's webpage via an advertising service computing system (also known as an online advertising network). As used herein, a publisher refers to an entity (person or organization) that issues content (e.g., copy, video, images, multimedia, etc.) online and/or provides online services (e.g., social media, email exchange, internet search engine, etc.). The publisher also provides or allocates portions of their webpages or associated opportunities (e.g., searching list) for advertising purposes. An advertiser refers to an entity that wants to place advertisements on the publisher's webpages, to be viewed by consumers while visiting the publisher's webpages. For example, an advertiser may be affiliated with an entity that provides or is associated with products and/or services related to advertisements, such as a merchant, retailer, wholesaler, warehouse, manufacturer, distributor, health care provider, educational establishment, financial establishment, technology provider, energy provider, utility provider, or any other product or service provider or distributor. The advertisements include any of data, text, pictures, video, audio, links, televisions content, videos, HTML, XML, xHTML, WAP pages, etc. Generally, the advertisements have embedded links to the advertiser's webpage that offers products/service for purchase. When the consumer activates the link by, for example, clicking on the advertisement having the embedded link through the user device, the user device sends a request for a webpage associated with the link to the advertiser (e.g., via an advertiser computing system). Upon receiving the request, the advertiser computing system retrieves financial information relating to the consumer from internal and/or external database(s). The database(s) can maintain a profile for the consumer, which includes the consumer's personal profile information, the consumer's accounts information, and/or information of the consumer's past activities. The financial information may be maintained by a financial institution. Based on the consumer-specific financial information, the advertiser computing system customizes the webpage associated with the link that is being requested by the consumer and transmits the customized webpage to the consumer. Since the webpage has been tailored to incentivize the consumer to purchase products/services offered by the advertiser, the effectiveness of advertising is enhanced.

For example, a consumer accesses a news webpage maintained by a new service (e.g., CNN). An electronics store (i.e., an advertiser) places a banner advertisement for a new HDTV that is available at the online shopping portal of the electronic store on the news webpage being displayed. The consumer sees the banner advertisement and clicks on the advertisement, which contains an embedded link to a website associated with the electronics store. Before or at the time when the webpage of the electronics store loads, the electronics store obtains financial information about the consumer, including, for example, financial information provided by a financial institution computing system. Based on the information, the electronics store computing system can route the consumer to different webpages and offer different terms. For example, if the financial information shows that the consumer is financially capable of purchasing the advertised product, the landing page from the advertisement click directs the consumer to a shopping cart page that is prepopulated with the product. If the consumer is not financially capable of purchasing, the landing page from the advertisement click directs the consumer to a product information page is displayed.

Referring to FIG. 1, a diagram of a computing environment 100 for providing a customized advertiser webpage to a consumer based on financial information relating to the consumer is shown according to an example embodiment. In the computing environment 100, a consumer 106 loads a webpage of a publisher system 130 by, for example, inputting the uniform resource locator (URL) associated with the publisher system 130 at the web browser 146 on a user device 140 or clicking on a link associated with the publisher system 130. The publisher system 130, when loading the webpage to the user device 140, sends a request to an advertising service computing system 110 for placing one or more advertisements on the webpage. The advertising service computing system 110, upon receiving the request, places an advertisement of the advertiser 104 on the webpage of the publisher system 130 for displaying to the consumer together with the content of the publisher's webpage. The advertisements may be selected to specifically target the consumer based in part on information about the consumer or the user device 140 (e.g., based on a geographic location of the user device 140 or the internet connection being used, based on a cookie associated with the user device 140, etc.).

The advertisement includes an embedded link to an advertiser computing system 120 affiliated with the advertiser 104. When the consumer 106 clicks on the advertisement thereby activating the link to the advertiser computing system 120, the user device 140 sends a request for an advertiser webpage associated with the link in the advertisement to the advertiser computing system 120. The advertiser computing system 120, upon receiving the request from the user device 140, sends a request for financial information relating to the consumer 106 to the advertising service computing system 110. The advertising service computing system 110 has compiled and stored a profile for the consumer 106 based on information collected from the publisher system 130, the advertiser computing system 120, the user device 140, and a financial institution 108 (e.g., bank, credit union, credit card issuer, etc.). The advertising service computing system 110 sends the requested information to the advertiser computing system 120. The advertiser computing system 120 customizes the advertiser webpage associated with the advertisement and loads the customized advertiser webpage to the user device 140 for displaying to the consumer 106. The webpage is customized to incentivize the consumer 106 to purchase by offering, for example, products/services, payment arrangements, promotional incentives, etc. tailored to the consumer's financial situation and preferences. In some arrangements, the advertising service computing system 110 sends a request for financial information relating to the consumer 106 directly to the financial institution computing system 150, which has compiled and stored a profile for the consumer 106. And the financial institution computing system 150 sends the requested information to the advertiser computing system 120.

In some arrangements, the advertising service computing system 110 can be integrated into the advertiser computing system 120 or the publisher system 130. The advertiser computing system 120 can place the advertisement, compile and store a financial profile for the consumer 106 on its own. In some arrangements, the advertising service computing system 110 can be omitted from the computing environment 100 and the financial institution computing system 150 can compile and store a financial profile for the consumer 106. Although the methods of online advertising are discussed below with reference to the architecture shown in FIG. 1, it shall be understood that the methods can be implemented in other architectures in which the advertising service computing system 110 is integrated into the advertiser computing system 120 or the publisher system 130 or is omitted.

The publisher system 130 may be affiliated with a content provider, such as an online publication and news provider (e.g., online newspapers, online magazines, television websites, etc.), a travel website, a blog, a music streaming website, a sports website, or the like. The publisher content may include various types of content including web-based information, such as articles, discussion threads, reports, analyses, financial statements, dictionaries, encyclopedias, music, video, graphics, search results, web page listings, information feeds (e.g., RSS feeds), etc. The publisher system 130 also includes entities that provide online services such as social networking (e.g., Facebook®, LinkedIn®, Twitter®), email exchange (e.g., Gmail®, Hotmail®), e-commerce (e.g., Amazon®, eBay®), e-banking (e.g., online account management), search engine (e.g., Google®), gaming network, etc. The publisher system 130 provides or allocates one or more content areas of their webpages or associated opportunities for advertising purposes (e.g., a banner advertising message, a search listing, etc.). When the consumer 106 loads a webpage of the publisher system 130 (e.g., input the URL associated with the publisher system 130 at the web browser 146 on the user device 140, or click on a link associated with the publisher system 130), the publisher system 130 sends a request to the advertising service computing system 110 (or to the advertiser computing system 120) for placing one or more advertisements on the webpage. The request may include the desired number of advertisements, search queries entered by the consumer 106, search results, keywords identified on the webpage, etc. In some arrangements, the request is a bid request, which asks the advertising service computing system 110 to have associated advertisers to bid the advertising spaces/opportunities.

The advertiser 104 refers to an entity that wants to place advertisements on the publisher's webpages, to be viewed by consumers while visiting the publisher's webpages. For example, the advertiser 104 may be affiliated with an entity that provides or is associated with products and/or services related to advertisements, such as a merchant, retailer, wholesaler, warehouse, manufacturer, distributor, health care provider, educational establishment, financial establishment, technology provider, energy provider, utility provider, or any other product or service provider or distributor. An entity can be both an advertiser and a publisher under various situations. For example, a bank can be a publisher that provides online banking service to customers. The same bank can also be an advertiser when its mortgage advertisements are placed on a webpage of a real estate agency.

The advertiser computing system 120, affiliated with the advertiser 104, includes a processor 121, memory 122, and a network interface 123. Memory 122 stores various program instructions that, when executed by the processor 121, control the operations of the advertiser computing system 120. The network interface 123 allows the advertiser computing system 120 to send and receive data to and from external devices and entities via the network 102. The advertiser computing system 120 includes a webpage customization circuit 124 executable by the processor 121 to implement the webpage customization function described herein. The operations of the offer customization circuit 124 will be discussed in more detail below with reference to FIG. 3. The advertising computing 120 further includes a products/services database 125 that stores information relating to products/services offered by the advertiser 104, for example, what the products/services are, prices for the products/services, payment arrangements applicable to the products/services, promotion programs regarding the products/services, delivery terms applicable to the products/services, etc.

The advertiser computing system 120 may directly or indirectly generate and maintain advertisements related to products/services offered by or otherwise associated with the advertiser 104. The advertisements can be in the form of a graphical advertisement (e.g., a banner advertisement), a text advertisement, an audio advertisement, a video advertisements, or an advertisement combining one of more of any of such components. The advertisements can also include machine executable code, interactive advertisements, embedded information such as links, meta-data, and so on.

The advertiser 104 can purchase advertising spaces/opportunities (e.g., banner advertisement, pop-up advertisement, advertised search results, etc.) on webpages of the publisher system 130 through the advertiser computing system 120 or further through the advertising service computing system 110. In some arrangements, the advertising computing system 120 submits advertisement(s) to be served to consumers to the publisher system 130. In some arrangements, the advertising computing system 120 submits advertisement(s) to be served to consumers, desirable advertisement triggers (e.g., search query, keyword), and bids to be paid in exchange for advertising opportunities to the advertising service computing system 110. If the advertising service computing system 110 matches the advertisement of the advertiser 104 with the request for advertisements (e.g., a bid request) from the publisher system 130, it places the advertisement on the webpage of the publisher system 130 for displaying together with the content of the publisher's webpage. If the consumer 106 clicks on the advertisement, the user device 140 sends a request for an advertiser webpage associated with the advertisement to the advertiser computing system 120. In some arrangements, the advertiser computing system 120 may maintain a financial profile of the consumer 106 and retrieves the profile upon receiving the request. In some arrangements, the advertising service computing system 110 maintains the financial profile of the consumer 106. The advertiser computing system 120, upon receiving the request, sends a request for the financial profile of the consumer 106 to the advertising service computing system 110. In some arrangements, the financial institution computing system 150 maintains the financial profile of the consumer 106. The advertiser computing system 120, upon receiving the request, sends a request for the financial profile of the consumer 106 to the financial institution computing system 150. Based on the consumer-specific financial information obtained, the advertiser computing system 120 customizes the webpage associated with the advertisement and loads the customized webpage to the user device 140 for displaying to the consumer 106.

In some arrangements, the advertising service computing system 110 (also known as an online advertising network) connects advertisers to publishers by aggregating advertisement opportunities supplied from publishers and matching them with advertisers' demands. In other words, the advertising computing system 100 acts as an intermediate for buying and selling advertising opportunities across a plurality of publishers and advertisers. The advertising service computing system 110 includes a processor 111, memory 112, and a network interface 113. Memory 112 stores various program instructions that, when executed by the processor 111, control the operation of the advertising service computing system 110. The network interface 113 allows the advertising service computing system 110 to send and receive data to and from external devices and entities via the network 102. The advertising service computing system 110 includes an advertisement management circuit 114 executable by the processor 111 to implement the functions of matching the publishers with the advertisers. For example, the advertising service computing system 110 receives, from a plurality of publishers, requests for placing advertisements on the publishers' webpages, which requests include the desired number of advertisements, search queries entered, search results, keywords identified on the webpage, etc. The advertising service computing system 1110 also receives, from a plurality of advertisers, advertisement(s) to be served to consumers, desirable advertisement triggers (e.g., search query, keyword), and bids to be paid in exchange for advertising opportunities. In matching the publishers with the advertiser, the advertisement management circuit 114, for example, extracts a trigger (e.g., keyword) of the publisher's webpage, compares the trigger to the desirable advertisement triggers submitted by the advertisers, and holds an auction to decide the advertiser to whom the advertisement opportunity goes.

In some arrangements, the advertisement management circuit 114 further takes into account information relating to the consumer (e.g., demographics, psychographics, product purchase history, etc.) when deciding what advertisements to present to the consumer, which is known as targeted advertising. The advertising service computing system 100 includes a profile management circuit 115 executable by the processor 111 to implement the functions of managing consumer profiles. The profile management circuit 115 collects information relating to consumers from various sources and compiles the information. The operations of the profile management circuit 115 will be discussed in more detail below with reference to FIG. 2. In some arrangements, some functions of the advertising service computing system 110 can be integrated into the advertiser computing system 120 and/or the publisher system 130.

Still referring to FIG. 1, the advertising service computing system 110 includes various database, for example, an advertiser database 116, a publisher database 117, and a consumer profiles database 118. The advertiser database 116 stores information relating to advertisers, such as advertisement(s) to be served to consumers, desirable advertisement triggers (e.g., search query, keyword), and bids to be paid in exchange for advertising opportunities submitted by the advertisers. The publisher database 117 stores information relating to publishers, such as available advertisement opportunities/spaces provided by the publishers. The consumer profiles database 118 stores information relating to consumers (associated with user devices), such as demographics, psychographics, financial information, etc. The advertising service computing system 110 collects information relating to consumers from associated publishers and advertisers, user devices, financial institutions, etc., maintains user profiles by compiling the collected information, and stores the user profiles in the consumer profiles database 118. When the advertiser computing system 120 requests financial information relating to a specific consumer, the advertising service computing system 110 searches the consumer profiles database 118 and provides the information to the advertiser computing system 120.

The consumer 106 can access webpages of the publisher system 130 and webpages of the advertiser 104 through the user device 140. The user device 140 may be a smartphone, a portable media device, a personal digital assistant (PDA), a laptop computer, a personal computer, or the like. The user device 140 includes a processor 141, memory 142, and a network interface 143. Memory 142 stores various program instructions that, when executed by the processor 141, controls the operation of the user device 140. The network interface 143 allows the user device 140 to send and receive data to and from external devices and entities via the network 102. The network interface 123 may be a wireless network interface that communicates with a wireless communication protocol (e.g., 802.11a/b/g/n, Bluetooth®, ZigBee®, CDMA, GSM, LTE, WiMax, etc.) or a wired communication protocol (e.g., Ethernet, USB, Thunderbolt®, etc.). The user device 140 includes a display 144 and an input 145. In some arrangements, the display 144 and the input 145 are integrated in a touchscreen display. The user device includes a web browser 146 that enables presentation of webpage content provided by the publisher system 130 and advertising content provided by the advertiser computing system 120 on the display 144. The input 144 enables the consumer 106 to interact with the web browser 146 (e.g., click on an advertisement) via a user interface.

The financial institution 108 holds financial information relating to consumers (e.g., through the financial institution computing system 150). For example, the consumer 106 can have one or more financial accounts (e.g., check account, savings account, mortgage account, credit card account, etc.) with the financial institution 108. When opening the financial account(s), the consumer 106 submits personal profile information (e.g., age, gender, status, address, employer, income, etc.) to the financial institution 108, which is saved at the financial institution computing system 150. Moreover, the consumer 106 can use online services (e.g., online banking, mobile wallet) provided by the financial institution 108 through the financial institution computing system 150. The financial institution computing system 150 maintains the account information (e.g., balance of an account, credit line, available credit, etc.) and information of past activities (e.g., credit card transaction details, mortgage payments, etc.) for the consumer 106. The financial institution computing system 150 includes a processor 151, memory 152, and a network interface 153. Memory 152 stores various program instructions that, when executed by the processor 151, control the operation of the financial institution computing system 150. The network interface 153 allows the financial institution computing system 150 to send and receive data to and from external devices and entities via the network 102. The financial institution computing system 150 also includes a user profiles database 154 that stores information relating to customers of the financial institution 108, such as personal profile information, accounts information, past activities information, etc. In some arrangements, the advertising service computing system 110 or the advertiser computing system 120 can collect consumers' information held by the financial institution computing system 105. In some arrangements, the original financial information may be concealed. For example, the financial institution computing system 105 would not tell "the consumer has $50 k in his checking account and makes $250 k/year." Rather, the financial institution computing system 105 would probably say "yes, the customer can afford the advertised product" or "yes, the customer routinely shops at stores in your category"—more generic information like that. These are, of course, non-limiting examples of what can be passed.

The network 102 facilitates communication between the above-noted devices, computing systems, and entities. The network 102 may include private networks, public networks, or a combination thereof. In some arrangements, the network 102 includes the Internet.

Figure 2:
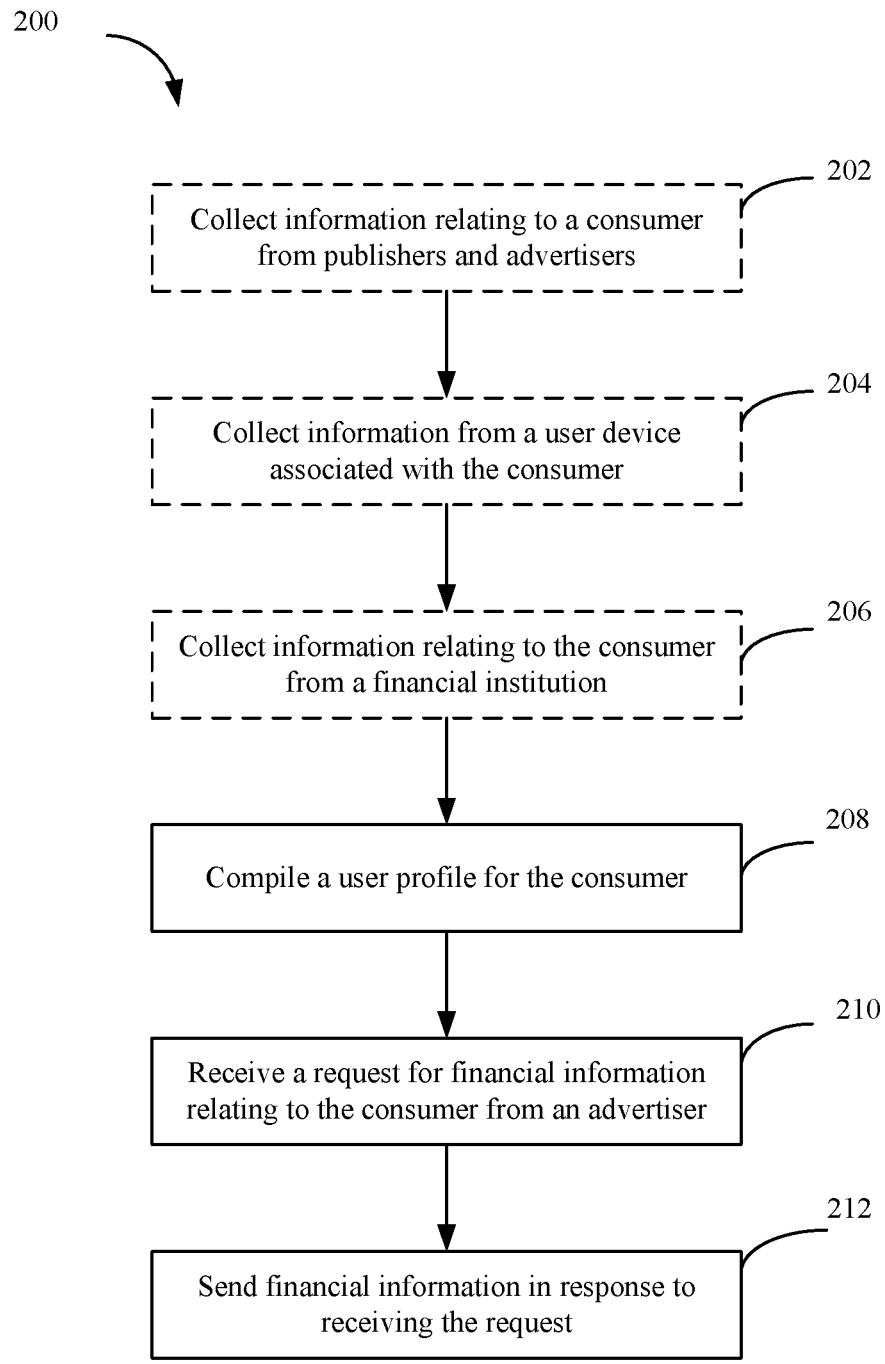
FIG. 2 is a flow diagram of a method of managing consumer profiles for an advertiser according to an example embodiment.

Referring to FIG. 2, a flow diagram of a method 200 of managing consumer profiles for an advertiser is shown according to an example embodiment. In some arrangements, the method 200 is performed by the advertising service computing system 110 (e.g., by the processor 111). In other arrangements, the method 200 is performed by the advertiser computing system 120 (e.g., by the processor 121).

At 202, information relating to the consumer 106 from publishers and advertisers at 202 is collected. In particular, publishers and advertisers that sell and buy advertising opportunities through the advertising service computing system 110 can store information in their cookies. As used herein, a cookie refers to a small piece of data sent from a website and stored in a consumer's web browser while the consumer is browsing the website. A cookie is also known as hypertext transfer protocol (HTTP) cookie, web cookie, Internet cookies, or browser cookie. The cookie includes a user device identifier that uniquely identifies the device employed by the consumer to browse the website. The cookie also records activities conducted by the consumer at the website and information provided by the consumer to the website through the user device. Every time the consumer loads the website using the user device, the web browser on the device sends the cookie back to a server of the website to notify the consumer's past activities and information.

Cookies of the publishers can store financial information relating to the consumer. As discussed above, the publishers can provide services such as social networking (e.g., Facebook®, LinkedIn®, Twitter®), email exchange (e.g., Gmail®, Hotmail®), e-commerce (e.g., Amazon®, eBay®), e-banking (e.g., online account management), search engine (e.g., Google®), gaming network, etc. For the consumer 106 to use the online services, a publisher establishes an online service account for the consumer 106. When setting up the account, the consumer 106 submits (e.g., via the user device 140) personal profile information (e.g., name, age, gender, address, education, income, etc.) to the publisher. Cookies of the publishers can record such information. In addition, when the consumer 106 conducts activities at the website of the publisher (e.g., post an entry at Facebook®, purchase a product at Amazon®), the activities can also be recorded in the cookies. Every time the consumer 106 returns to the website of the publisher, the publisher can retrieve the cookie from the user device 140, queries the cookie, and/or extracts information from the cookie. When the publisher submits a request for advertisement(s) (e.g., a bid request) to the advertising service computing system 110, the retrieved cookie/information can be sent to the advertising service computing system 110 with the request.

Cookies of the advertisers also store financial information relating to the consumer. The webpages of advertisers (e.g., merchants, retailers) offer products and services for purchase by the consumer. Every time the consumer 106 browsers the webpage of an advertiser (e.g., via the web browser 146 on the user device 140), the cookie of the advertiser on the user device records the consumer's activities conducted at the website of the advertiser. For example, the cookie records what products/services the consumer 106 purchased, what products/services the consumer 106 looked at but did not buy, payment instruments the consumer 106 used to make the purchase (e.g., credit card, rewards card, debit card, electronic funds transfer, etc.), payment arrangements (e.g., paid in twelve month with zero interest, paid up front, etc.), address for delivery, delivery terms (e.g., free shipping), the time and location of the transaction, the length of time over which the transaction was conducted, the amount of funds involved in the transaction, etc. The advertisers can provide the cookies to the advertising service computing system 110 for the purpose of targeted advertising.

At 204, information relating to the consumer 106 is collected from the user device 140 associated with the consumer 106. In particular, the advertising service computing system 110 (or the advertiser computing system 120, or the financial institution computing system 150) can collect the information by using third-party cookies. As used herein, a third-party cookie refers to a cookie that is placed on the user device by a web site other than the website the consumer is browsing. For example, when the consumer 106 browses a webpage of the publisher system 130 (e.g., via the web browser 146 on the user device 140), the advertising service computing system 110 places an advertisement (e.g., a banner advertisement) on the webpage of publisher system 130. When the web browser 146 asks for the banner advertisement from the advertising computing system 110, the advertising computing system 110 is allowed to set a third-party cookie on the user device 140. The advertising computing system 110 can track activities of the consumer 106 across all webpages where it has placed advertisements by using the third-party cookies. Each time the consumer browses a webpage that has invoked the advertising computing system 110 to place a third-party cookie, the advertising service computing system 110 retrieves the third-party cookie and identifies the unique device identifier associated with the user device 140. The third-party cookies sent back by the user device 140 may include the information as discussed above with respect to the cookies of the publishers and the advertisers.

At 206, information relating to the consumer is collected from the financial institution 108 (via the financial institution computing system 150). In some arrangements, the financial institution 108 is associated with the advertising service computing system 110 as a publisher and/or an advertiser. For example, the financial institution 108 (e.g., via the financial institution computing system 150) requests the advertising service computing system 110 to place its mortgage advertisements on a publisher's searching list, or the financial institution 108 engages the advertising service computing system 110 to sell advertising spaces/opportunities available on its webpage. In this situation, the advertising service computing system 110 can collect information relating to the consumer 106 through cookies provided by the financial institution 108 or third-party cookies as discussed above.

Cookies of the financial institution 108 (and third-party cookies) can store information provided by the consumer 106 to the financial institution 108 and/or activities of the consumer 106 conducted at the website of the financial institution 108. For example, the financial institution 108 provides e-banking services to the consumer 106 (e.g., online banking, mobile wallet, etc.). When the consumer 106 sets up the service account, the cookies record the personal profile information provided by the consumer 106 to the financial institution 108. When the consumer 106 uses the banking webpage to pay bills, check balances, or the like, the cookies record the information of the accounts and the transactions.

Additional or alternatively, information can be collected from the financial institution 108 through an application program interface (API) provided by the financial institution 108 (through the financial institution computing system 150). The financial institution 108 provides the API to allow third-parties to leverage information stored in the database of the financial institution 108 (e.g., the user profiles database 154). That is, by executing an application written pursuant to API, the advertising service computing system 110 can utilize information stored in the databases of the financial institution computing system 150. Besides online account/transaction information, the databases of the financial institution 108 can store a wide range of conventional transactions (e.g., point of sale activities). The advertising service computing system 110 can collect information across a number of different financial institutions that are exposed by way of respective APIs. In further arrangements, approval must be acquired for the advertising service computing system 110 or the advertiser computing system 120 to access the information maintained by the financial institution 108. For example, when the consumer 106 uses services of the financial institution 108 (online and/or conventional), the consumer 106 might agree to certain terms and conditions, which allow the retrieval of the consumer's information by third-parties. In some arrangements, the original financial information may be concealed. For example, the financial institution computing system 105 would not tell "the consumer has $50 k in his checking account and makes $250 k/year." Rather, the financial institution computing system 105 would probably say "yes, the customer can afford the advertised product" or "yes, the customer routinely shops at stores in your category"—more generic information like that. These are, of course, non-limiting examples of what can be passed.

At 208, a user profile is compiled based on the information collected from the publishers, the advertisers, the user device 140 associated with the consumer 106, and/or the financial institutions. A wide range of information (e.g., personal profile information, accounts information, etc.) and a large number of past activities (e.g., web browsing, shopping, purchasing, etc.) of the consumer 106 can be aggregated to arrive at a user profile. In some arrangements, all cookies including information relating to the consumer 106 are put under the consumer's profile. The cookies relating to the same consumer 106 can be identified by the unique device identifier of the user device 140 associated with the consumer 106. In some arrangements, the data recorded in the cookies are organized under categories, such as personal profile information, financial account information, and information of past activities. The personal information includes age, gender, address, occupation, education, income, etc. The account information includes data describing the type of account(s), (e.g., savings, checking, mortgage, IRA, credit card), asset/loan, balance of debit accounts, available credits of credit cards, etc. In some arrangements, the account type information does not include the account number of the consumer in order to protect the privacy of the consumer. The transaction information describes individual transactions transacted by the consumer such as, e.g., a credit/debit card purchase at a retailor location, merchant/retailer identifier, the total transaction dollar amount of the transaction, the type of transaction, the location of the merchant, a date/time stamp, etc. In further arrangements, the collected information may be analyzed to reach some statistics and/or to identify some behavioral patterns/trends relating to the consumer 106. For example, by analyzing the past transactions, it can be inferred that the consumer spends about $300 on clothes every month, or 80% of the consumer's expenditures is on credit cards, etc. The complied user profile can be stored in a database, for example, the consumer profiles database 118 of the advertising service computing system 110, or similar database affiliated with the advertiser computing system 120 or the financial institution system 150. The compilation is a continuous process, i.e., the user profile will be updated with new data relating to the consumer.

At 210, a request for financial information relating to the consumer 106 is received. In some arrangements, the request is internal to the advertiser computing system 120, i.e., the database affiliated with the advertiser computing system 120 receives the request from the processor 121. In some arrangements, the advertising service computing system 110 receives the request from the advertiser computing system 120. In particular, the consumer 106 has loaded a webpage of the publisher system 130, the publisher system 130 retrieves its cookie from the user device 140 and sends a request for placing advertisements together with the cookie (or information extracted from the cookie) while loading the page on the user device 140. The advertising service computing system 110 receives the request and the cookie, matches an advertisement of the advertiser 104 with the request of the publisher system 130 and places the advertisement on the webpage of the publisher system 130 for displaying to the consumer 106 via the user device 140. The advertisement includes an embedded link to the website of the advertiser 104 (e.g., hosted by the advertiser computing system 120). The consumer 106 activates the link by, for example, clicking on the advertisement. When the link is activated, the user device 140 sends a request for a webpage of the advertiser 104 to the advertiser computing system 120. Upon receiving the request, the advertiser computing system 120 sends a request to the advertising service computing system 110 for financial information relating to the consumer 106. In the request, the advertiser computing system 120 identifies the consumer 106 with the unique device identifier associated with the user device 140, which is retrieved from the advertiser's cookie. In some arrangements, the advertiser computing system 120 specifies in the request what financial information relating to the consumer is desire, for example, expenditures on electronics in six months, account balance, address, etc. In other arrangements, the advertiser computing system 120 lets the advertising service computing system 120 decide what financial information to send.

At 212, the requested financial information relating to the consumer is sent. For example, the advertising service computing system 110 or the advertiser computing system 120, upon receiving the request, searches its database for the consumer profile associated with the unique device identifier of the user device 140. When the match is found, the requested information is sent to the requester. In some arrangements, the advertising service computing system 110 provides API for the advertiser 104 to leverage the information. That is, by executing an application written pursuant to API, the advertiser computing system 120 can utilize information stored in the consumer profiles database 118 on the advertising service computing system 110.

In other arrangements, the method 200 is performed by the financial institution computing system 150 (e.g., by the processor 151). The financial institution computing system 150 may perform some, but not all, of the processes of the method 200. For example, the financial institution computing system 150 may collect information relating to the consumer 106 by using first-party or third-party cookies. Cookies of the financial institution 108 (and third-party cookies) can store information provided by the consumer 106 to the financial institution 108 and/or activities of the consumer 106 conducted at the website of the financial institution 108. For example, the financial institution 108 provides e-banking services to the consumer 106 (e.g., online banking, mobile wallet, etc.). When the consumer 106 sets up the service account, the cookies record the personal profile information provided by the consumer 106 to the financial institution 108. When the consumer 106 uses the banking webpage to pay bills, check balances, or the like, the cookies record the information of the accounts and the transactions. The financial institution computing system 150 may compile a user profile based on the information collected.

When the financial institution computing system 150 receives a request for financial information relating to the consumer from the advertiser computing system 120, the financial institution computing system 150 searches its database for the consumer profile associated with the unique device identifier of the user device 140. When the match is found, the requested information is sent to the requester. In some arrangements, the financial institution computing system 150 provides API for the advertiser 104 to leverage the information. That is, by executing an application written pursuant to API, the advertiser computing system 120 can utilize information stored in the user profiles database 154 on the financial institution computing system 150. In some arrangements, the original financial information may be concealed. For example, the financial institution computing system 105 would not tell "the consumer has $50 k in his checking account and makes $250 k/year." Rather, the financial institution computing system 105 would probably say "yes, the customer can afford the advertised product" or "yes, the customer routinely shops at stores in your category"—more generic information like that. These are, of course, non-limiting examples of what can be passed. In further arrangements, approval must be acquired for the advertising service computing system 110 or the advertiser computing system 120 to access the information maintained by the financial institution 108. For example, when the consumer 106 uses services of the financial institution 108 (online and/or conventional), the consumer 106 might agree to certain terms and conditions, which allow the retrieval of the consumer's information by third-parties.

Figure 3:
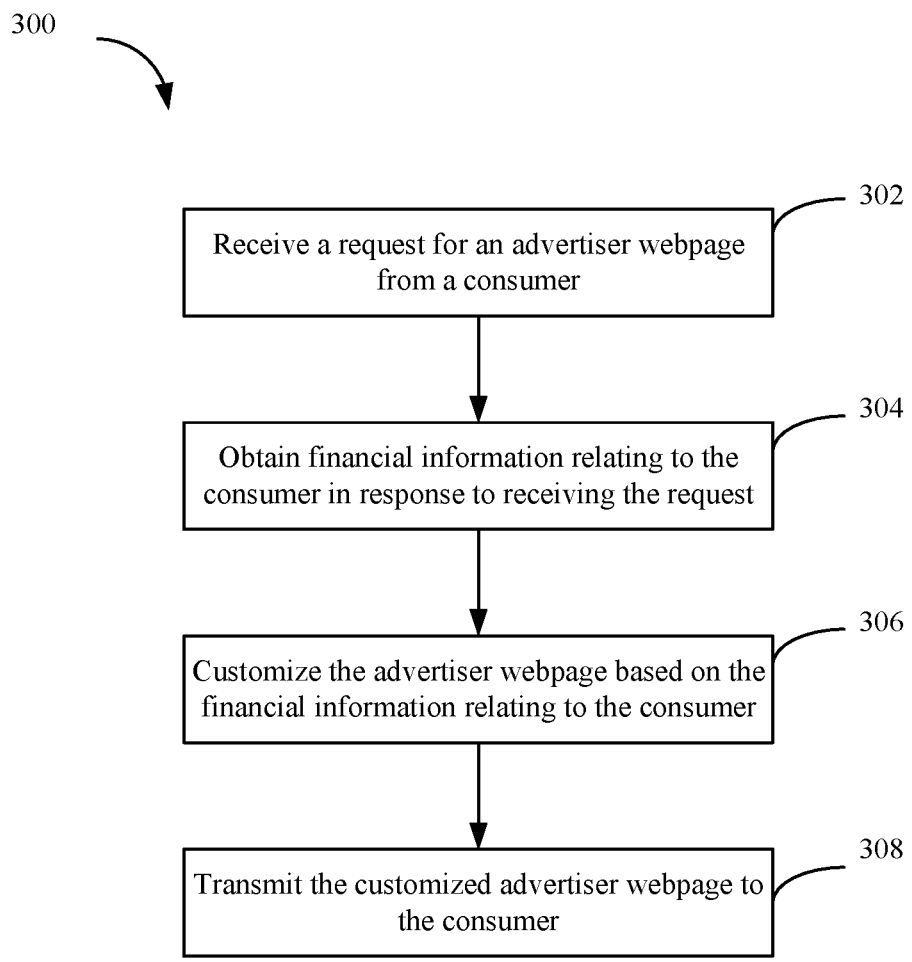
FIG. 3 is a flow diagram of a method of providing a customized advertiser webpage to a consumer according to an example embodiment.

Referring to FIG. 3, a flow diagram of a method 300 of providing a customized advertiser webpage to a consumer based on financial information relating to the consumer is shown according to an example embodiment. The method 300 is performed by the advertiser computing system 120 (e.g., by the processor 121).

The method 300 begins when the advertiser computing system 120 receives a request for an advertiser webpage from the user device 140 associated with the consumer 106. An advertisement of the advertiser has been placed on a webpage of the publisher. In particular, the consumer 106 has loaded the webpage of the publisher system 130. The webpage of the publisher system 130 may be an online publication and news page (e.g., online newspapers, online magazines, television websites, etc.), a travel website, a blog, a music streaming website, a sports website, or the like. The webpage may be for an online service, such as social networking (e.g., Facebook®, LinkedIn®, Twitter®), email exchange (e.g., Gmail®, Hotmail®), e-commerce (e.g., Amazon®, eBay®), e-banking (e.g., online account management), search engine (e.g., Google®), gaming network, etc. The webpage has one or more content areas or associated opportunities for advertising purposes. In some arrangements, the advertiser computing system 120 places an advertisement (e.g., a banner advertising message, a pop-up advertisement, a search listing, etc.) on the webpage of the publisher. In some arrangements, the advertiser computing system 120 places the advertisement via the advertising service computing system 110. The advertisement may include an embedded link (e.g., a URL) to an advertiser webpage that is subject to customization. The embedded link directs back to a webpage relating to a product/service for purchase, which webpage is not yet established when the advertisement is placed. What information the webpage is to display and/or what terms are to offer is to subject to further determination and customization specific to the consumer 106. The consumer 106 can activate the link by, for example, clicking on the advertisement placed on the webpage of the publisher that is being displayed to the consumer 106. When the link is activated, the user device 140 sends a request for a webpage of the advertiser 104 associated with the link to the advertiser computing system 120.

At 304, the advertiser computing system 120 obtains financial information relating to the consumer 106 in response to receiving the request from the user device 140. In some arrangements, the advertiser computing system 140 obtains the information from an affiliated database, i.e., using the unique device identifier associated with the user device 120 to locate and retrieve corresponding information from the affiliated database. In some embodiments, the advertiser computing system 120 receives the information from the advertising service computing system 110 or the financial institution computing system 150. In particular, the advertiser computing system 120 sends a request to the advertising service computing system 110 or the financial institution computing system 150 for financial information relating to the consumer 106. In the request, the advertiser computing system 120 identifies the consumer 106 with the unique device identifier associated with the user device 140, which can be retrieved from the advertiser's cookie. In some arrangements, the advertiser computing system 120 specifies in the request what financial information relating to the consumer is desire, for example, expenditures on electronics in six months, accounts balance, address, etc. In other arrangements, the advertiser computing system 120 lets the advertising service computing system 110 or the financial institution computing system 150 decide what financial information to send. The advertising service computing system 110 or the financial institution computing system 150, upon receiving the request, searches the consumer profiles database 118 or the user profiles database 154 for the consumer profile associated with the unique device identifier of the user device 140. When the match is found, the advertising service computing system 110 or the financial institution computing system 150 sends the requested information to the advertiser computing system 120. In some arrangements, the advertising service computing system 110 or the financial institution computing system provides API for the advertiser 104 to leverage the information.

At 306, the advertiser computing system 120 (e.g., the webpage customization circuit 124) customizes the webpage associated with the link for presenting to the consumer 106 based on the financial information relating to the consumer 106. In some arrangements, the advertiser computing system 120 determines a product and/or a service to offer to the consumer 106 on the webpage based on the information. For example, the past activities show that the consumer 106 had browsed a webpage of a competitor (or the advertiser 104 itself) but did not purchase a product/service offered by the competitor (or itself) probably because of price (e.g., as indicated by the consumer 106 completing steps of check out except a final purchasing step). The webpage customization circuit 124 then includes an advertisement promoting a similar product/service but of a lower price. In some arrangements, the financial information shows that the consumer is financially capable of purchasing the advertised product (e.g., adequate account balance and/or available credit line); the webpage customization circuit 124 may prepopulate a shopping cart with the product. If the consumer might not be financially capable of purchasing (e.g., inadequate account balance and/or available credit line), the webpage customization circuit 124 may just display a product information page. In some arrangements, the advertiser computing system 120 checks the consumer's income, purchase habits, preference, etc. to decide what products/services to offer. For example, the webpage customization circuit 124 can pop up the webpage with "suggested items" for the consumer 106 to consider purchasing based on the consumer's previous purchases and shopping habits (e.g., the consumer buys vitamins every three months). In another example, the webpage customization circuit 124 displays sale items on the webpage with particular features corresponding to the consumer's preferences (e.g., the preferred shirt color and size of the consumer).

In some arrangements, the advertiser computing system 120 determines a payment arrangement to offer to the consumer 106 on the webpage based on the financial information. For example, the financial information shows that funds available to the consumer 106 (e.g., balance of check account, balance of savings account, and available credits) is not adequate for purchasing the advertised products/services. The webpage customization circuit 124 places an offer of a twelve month zero interest payment arrangement on the webpage to incentivize the consumer 106 to make the purchase. In some arrangements, the financial information shows that the consumer 106 is a member of a rewards program provided by an entity (e.g., a manufacturer). The webpage customization circuit 124 places products/services provided by that entity on the next webpage to display to the consumer 106 with an indication that the consumer can use the rewards points to pay. In another example, the webpage customization circuit 124 places a notification of preauthorizing (e.g., credit card/loan application) to the consumer 106 based on the consumer's credit score, income, assets/loan, etc. In yet another example, the financial information shows that the consumer 106 is likely to pay with a credit card. The webpage customization circuit 124 can increase the price of the products/services offered a bit in order to counter the fees associated with credit card transactions.

In some arrangements, the advertiser computing system 120 determines a promotional incentive to offer to the consumer 106 on the webpage based on the financial information. The advertiser 104 can offer various promotional incentives including direct discount, free gift, special loyalty programs, etc. If the past transactions show that the direct discount has worked the best for the consumer 106, the webpage customization circuit 124 can place a promotion such as "10% OFF" on the next webpage. If the past transactions show that the free gift has worked the best for the consumer 106, the webpage customization circuit 124 can place a promotion such as "Free gift with a purchase over $100" on the next page, and so on.

In some arrangements, the advertiser computing system 120 determines a delivery term to offer to the consumer 106 on the next webpage based on the financial information. For example, the information indicates that the consumer's location is far from the advertiser's warehouse. It would not be profitable to offer free shipping to the consumer. The webpage customization circuit 124 places a delivery term such as "$7 for 5-7 days delivery" on the next webpage. If the consumer 106 lives near the advertiser's warehouse, the webpage customization circuit 124 places a delivery term such as "Free shipping for 5-7 day delivery" on the next webpage. In another example, the webpage customization circuit 124 can advertise that a store of the advertiser 104 locates near the consumer 106 on the next webpage.

In some arrangements, the advertiser computing system 120 determines the expiration date of the offer to the consumer 106 based on the financial information. For example, past activities show that the consumer is a quick buyer; the webpage customization circuit 124 can specify on the next webpage that the offer expires in two days. If the consumer is a slow buyer, the webpage customization circuit 124 can suggest, on the webpage, placing the item into the cart for the consumer to revisit sometime later. It shall be understood that the examples given herein are for illustration and not for limitation. There are various ways of customizing the webpage to display to the consumer based on the consumer specific financial information.

The advertiser computing system 120 transmits the customized webpage to the user device 140 associated with the consumer 106 at 308. The web browser 146 then displays the customized webpage to the consumer 106.

By customizing the next webpage being displayed to the consumer to reflect the consumer-specific information, a dynamic advertisement is generated in real time. The systems and methods disclosed herein provide a dynamic way for transmitting webpages to potential consumers in that different webpages of the advertiser can be shown to different consumers who are in different financial status. The advertisement reflects the consumer specific financial information in a variety of ways, thereby incentivizing consumers to purchase the advertised products/services.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:

receiving, by a computing system, a request for an advertiser webpage from a user device associated with a consumer, wherein the consumer requests the advertiser webpage by activating a link associated with the advertiser webpage and embedded in an advertisement placed on a webpage of a publisher;

receiving, from an advertising service computing system and by the computing system via an application programming interface (API), financial information relating to the consumer in response to receiving the request, wherein the financial information is associated with one or more financial institutions, wherein the advertising service computing system and the computing system exchange financial information via the API;

receiving, by the computing system, device information of the user device, the device information comprising a geographic location of the user device and cookie data, wherein the cookie data comprises past activities of the consumer on the webpage of the publisher and other webpages different from the publisher;

analyzing, by the computing system, the financial information and cookie data to identify past transaction trends associated with consumer spending, wherein past transaction trends are based on past transactions of the consumer, the past activities of the consumer, and a predefined period of time;

customizing, by the computing system, the advertiser webpage based at least in part on the financial information and the past transaction trends relating to the consumer, wherein the customizing of the advertiser webpage comprises determining a payment arrangement for the user based on the financial information, and wherein the payment arrangement is an incentive to make a purchase and a delivery term, the delivery term comprising a shipping price for the consumer based on the geographic location of the user device, and wherein the financial information comprises financial account data of the consumer; and transmitting, by the computing system, the customized advertiser webpage comprising the determined payment arrangement offer to the user device.

2. The method of claim 1, wherein the consumer activates the link by clicking on the advertisement, and wherein the link directs back to the advertiser webpage that is subject to customization.

3. The method of claim 1, wherein the receiving financial information relating to the consumer includes:
sending a request for the financial information relating to the consumer to the advertising service computing system or a financial institution computing system that maintains a database of consumer profile; and
receiving the financial information relating to the consumer from the advertising service computing system or the financial institution computing system.

4. The method of claim 1, wherein the financial information relating to the consumer includes information of a personal profile of the consumer, information of accounts associated with the consumer, and information of the past activities of the consumer.

5. The method of claim 1, wherein the customizing the advertiser webpage based on the financial information relating to the consumer includes determining a product and/or service to offer to the consumer on the advertiser webpage based on the financial information.

6. The method of claim 1, wherein the incentive is a promotional incentive to offer to the consumer on the advertiser webpage based on the financial information.

7. The method of claim 1, wherein the customizing the advertiser webpage based on the financial information relating to the consumer includes determining the delivery term to offer to the consumer on the advertiser webpage based on the financial information.

8. A computing system comprising:
a products/services database having information relating to products and/or services offered by an advertiser;
a network interface configured to communicate data to and from external devices;
memory; and
a processor structured to:
receive a request for an advertiser webpage from a user device associated with a consumer, wherein the consumer requests the advertiser webpage by activating a link associated with the advertiser webpage and embedded in an advertisement placed on the webpage of the publisher;
receive, via an application programming interface (API), financial information relating to the consumer from an advertising service computing system in response to receiving the request, wherein the financial information is associated with one or more financial institutions, wherein the advertising service computing system and the computing system exchange financial information via the API over the network interface;
receive device information of the user device, the device information comprising a geographic location of the user device and cookie data, wherein the cookie data comprises past activities of the consumer on the webpage of the publisher and other webpages different from the publisher;
analyze the financial information and cookie data to identify past transaction trends associated with consumer spending, wherein past transaction trends are based on past transactions of the consumer, the past activities of the consumer, and a predefined period of time;
customize the advertiser webpage based at least in part on the financial information and the past transaction trends relating to the consumer, wherein the customizing of the advertiser webpage comprises determining a payment arrangement for the user based on the financial information, and wherein the payment arrangement is an incentive to make a purchase and a delivery term, the delivery term comprising a shipping price for the consumer based on the geographic location of the user device, and wherein the financial information comprises financial account data of the consumer; and
transmit the customized advertiser webpage comprising the determined payment arrangement offer to the user device.

9. The computing system of claim 8, wherein the consumer activates the link by clicking on the advertisement, and wherein the link directs back to the advertiser webpage that is subject to customization.

10. The computing system of claim 8, wherein the processor is further structured to:
send a request for the financial information relating to the consumer to the advertising service computing system or a financial institution computing system that maintains a database of consumer profiles.

11. The computing system of claim 8, wherein the financial information relating to the consumer includes information of a personal profile of the consumer, information of accounts associated with the consumer, and information of the past activities of the consumer.

12. The computing system of claim 8, wherein the processor is further structured to determine a product and/or a service to offer to the consumer on the advertiser webpage based on the financial information relating to the consumer.

13. The computing system of claim 8, wherein the incentive is a promotional incentive to offer to the consumer on the advertiser webpage based on the financial information relating to the consumer.

14. The computing system of claim 8, wherein the processor is further configured to determine the delivery term to offer to the consumer on the advertiser webpage based on the financial information relating to the consumer.

15. A non-transitory computer-readable media having computer-executable instructions embodied therein, when executed by a processor of a computing system, cause the computing system to perform a process, the process including:
receiving a request for an advertiser webpage from a user device associated with a consumer, wherein the consumer requests the advertiser webpage by activating a link associated with the advertiser webpage and embedded in an advertisement placed on a webpage of a publisher;
receiving, via an application programming interface (API), financial information relating to the consumer from an advertising service computing system in response to receiving the request, wherein the financial information is associated with one or more financial institutions, wherein the advertising service computing system and the computing system exchange financial information via the API;
receiving device information of the user device, the device information comprising a geographic location of the user device and cookie data, wherein the cookie data comprises past activities of the consumer on the webpage of the publisher and other webpages different from the publisher;
analyzing the financial information and cookie data to identify past transaction trends associated with consumer spending, wherein past transaction trends are based on past transactions of the consumer, the past activities of the consumer, and a predefined period of time;

customizing the advertiser webpage based at least in part on the financial information and the past transaction trends relating to the consumer, wherein the customizing of the advertiser webpage comprises determining a payment arrangement for the user based on the financial information, and wherein the payment arrangement is an incentive to make a purchase and a delivery term, the delivery term comprising a shipping price for the consumer based on the geographic location of the user device, and wherein the financial information comprises financial account data of the consumer; and transmitting the customized advertiser webpage comprising the determined payment arrangement offer to the user device.

16. The media of claim 15, wherein the consumer activates the link by clicking on the advertisement, and wherein the link directs back to the advertiser webpage that is subject to customization.

17. The media of claim 15, wherein the receiving financial information relating to the consumer includes:

sending a request for the financial information relating to the consumer to the advertising service computing system or a financial institution computing system that maintains a database of consumer profiles; and receiving the financial information relating to the consumer from the advertising service computing system or the financial institution computing system.

18. The media of claim 15, wherein the financial information relating to the consumer includes information of a personal profile of the consumer, information of accounts associated with the consumer, and information of the past activities of the consumer.

19. The media of claim 15, wherein the customizing the advertiser webpage based on the financial information relating to the consumer includes determining a product and/or a service to offer to the consumer on the advertiser webpage based on the financial information.

20. The media of claim 15, wherein the incentive is a promotional incentive to offer to the consumer on the advertiser webpage based on the financial information.

21. The media of claim 15, wherein the customizing the advertiser webpage based on the financial information relating to the consumer includes determining the delivery term to offer to the consumer on the advertiser webpage based on the financial information.

22. The method of claim 1, wherein customizing the advertiser webpage is further based on generating a graphical advertisement including an interactive element, and wherein the cookies further include a user device identifier.

23. The method of claim 1, wherein the advertiser computing system retrieves the financial information from a database internal or external to the advertiser computing system.

24. The method of claim 1, wherein the request comprises keywords identified on the advertiser webpage and search queries entered by the user device; and storing, by the computing system, the keywords identified and the search queries in an advertiser database.

25. The method of claim 1, wherein a payment arrangement includes at least a period of time and an interest rate for the period of time.

* * * * *